Figure 1:
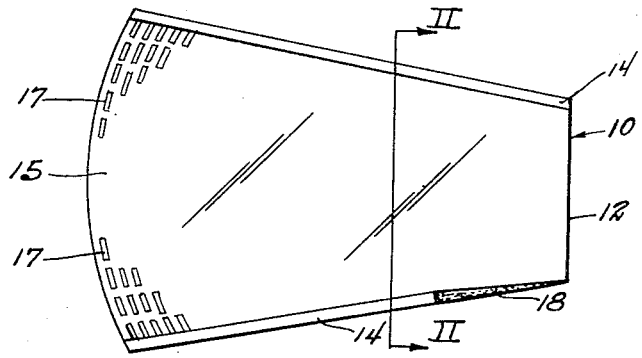

June 14, 1955

C. S. LINDER 2,710,900

ELECTROCONDUCTIVE ARTICLE

Filed Oct. 13, 1950

INVENTOR
CYRIL S. LINDER

BY Olen E Bee

ATTORNEY.

United States Patent Office 2,710,900
Patented June 14, 1955

2,710,900
ELECTROCONDUCTIVE ARTICLE

Cyril S. Linder, Tarentum, Pa., assignor to Pittsburgh Plate Glass Company, Allegheny County, Pa., a corporation of Pennsylvania Application October 13, 1950, Serial No. 189,988

13 Claims. (Cl. 201—73)

This invention relates to improved ceramic or refractory bodies, particularly to transparent ceramic or refractory articles such as windshields or other similar structures, having electroconductive transparent coatings deposited thereon. The invention further relates to an improved method for depositing electroconductive transparent coatings upon ceramic or refractory viewing closures. More particularly, it relates to articles of this character having laterally spaced electroconductive strips or bus bars in electrical contact with the film and adapted to facilitate passage of electric current through the coating.

It is known that transparent electroconductive films may be deposited upon glass by applying stannic chloride to the surface of glass heated above 400° F., preferably 850 to 1350° F. Films of superior conductivity may be produced according to methods described in application for United States Letters Patent, Serial No. 762,658 and Serial No. 762,659, both filed July 22, 1947 by William O. Lytle now Patents Nos. 2,614,944 and 2,648,754, respectively. These films or coatings are obtained by spraying plate, window or other glass while it is heated to a temperature of above 400° F. but below the temperature at which the glass becomes molten, with tin tetrachloride or other tin salts in aqueous solution or in vapor state, in the presence of a reducing agent such as methanol, phenyl hydrazine hydrochloride, or other agents. The films thus obtained are of unknown composition, but appear to contain a preponderant amount, of the order of 97 to 99% or more of a tin oxide and certain impurities which may include metallic tin, carbon, silicon, sodium and chlorine and other impurities, depending upon the composition of the applied tin containing solution. These films have a thickness of about 50 to 800 millimicrons, are transparent and have the unusual characteristic of being electroconductive, the particular degree of electroconductivity being dependent, to a large degree, upon the nature of the process of depositing the films. Tin oxide films, which are deposited in accordance with the processes described and claimed in the aforesaid applications of William O. Lytle, incorporation of the disclosure of which is made a part hereof by reference, have a resistance below about 500 ohms per unit square, a specific resistance below about 0.002 ohm centimeters, and a haze factor below about 2.5%. Further details respecting the production of these films will be supplied hereinafter. Although articles having such films are useful in many fields, they have been found to be especially useful as windshields or viewing closures in automobiles, aircraft, trains and similar automotive vehicles. In such use the coating is placed in series with a source of electric potential and is used as a heating element in order to heat the closure and prevent deposition of ice, fog, etc. thereupon.

As disclosed in the Lytle application, a glass sheet, usually of plate glass or other flat glass structure (including bent or curved glass structures), is provided with conducting metal strips suitable for bus bars. These strips are generally located adjacent the edges of the glass (usually within 0.5 inch of the edge) and, in the preferred embodiments, are located on opposed marginal edges. For example, in an essentially rectangular viewing closure such as a windshield, two bus bars are applied on a pair of opposite marginal edges. These metallized strips must be capable of withstanding the temperatures and oxidizing conditions of treatment and therefore, preferably should be of a ceramic character. Furthermore, they should be capable of fusing or otherwise forming an adherent, well-bonded coating to the glass. The strips should adhere firmly to the glass sheet, and should have a conductivity at least 10 to 20 times that of the conductive coating. Generally the strips are from about 0.05 to 1 inch in width.

In practice, it has been found that the most satisfactory compositions, for use in preparing the bus bars, comprise a highly conductive metal powder, (preferably gold or silver) and a vitrifying binder. The ingredients forming the vitrifying binder, for example, litharge, boric acid, and silica, are heated to a sufficient temperature, for example 1700° F., to compel them to fuse and form a glasslike mass. This mass is then converted into a frit by grinding, usually in a ball mill. The electroconductive metal, such as silver, is then added to this frit and spraying or screening vehicles are added to the composition to facilitate their application. Some of the vehicles usually employed are French fat oil, turpentine, water and ethyl alcohol. Typical ceramic conductive coating materials which may be used have the following composition:

| | Percent by weight |
|---|---|
| 1. Litharge | 7.5 |
| Boric acid | 1.0 |
| Silica | 1.5 |
| Flake silver | 70.0 |
| French fat oil | 12.5 |
| Turpentine | 7.5 |
| 2. Finely divided silver | 72.6 |
| Litharge | 9.3 |
| Silica | 1.7 |
| Boric acid | 1.4 |
| Water | 7.5 |
| Ethyl alcohol | 7.5 |

In order to avoid production of bus bars which will develop, in use, excessive stresses in the glass, the bus bar preferably should be located on the extreme edge of the glass and the bus bar thickness should not exceed about 0.005 inch and, preferably, should be below about 0.003 inch.

After application of the ceramic metal bus bars to the glass sheet by painting or other method, the sheet is heated to the temperature at which application of the conductive coating may be effected, for example above about 400 to 800° F. but below the fusion point of the glass, usually 950 to 1150° F. During this heating operation, the ceramic metal coating is fused onto the glass so that a firm bond is established between the glass and the metal coating.

When the glass has been heated as above described, for one or two minutes, it is withdrawn from the heating chamber and immediately is sprayed with the coating solution before substantial cooling of the glass sheet can take place. A quantity of the coating solution is placed in an atomizing spray gun and the heated glass sheet is sprayed with an atomized spray of this material for a brief period, usually of the order of 2 to 20 seconds, depending upon the thickness of film to be produced, the air pressure imposed upon the atomizing spray gun, etc. Usually this spraying operation is conducted in air of atmospheric humidity or oxygen. However, conductive coatings have been obtained even when oxygen appears to be essentially absent, although it is probable that oxygen combined in water or similar compound is present. This process results in the production of a base coated with a thin oxide electroconductive film.

Articles produced according to the above description, further details of which will be supplied below, are suitable for use as viewing closures or windows. Usually they are laminated with a suitable plastic such as polyvinyl butyral to reinforce the glass and provide a so-called "safety glass" construction. These closures may be successfully heated by imposing an electric potential across the bus bars, thus using the conductive film as a resistance element.

In the past, an unduly high number of windshields or like panels of the type herein described have failed in use or test. This failure frequently is manifested by fracture of the glass after an electric potential has been imposed across the bus bars to cause the film to be heated to a suitable temperature (for example 100 to 125° F. or above) for a period of time. Such failure has been discovered to be particularly apt to occur in certain panels having a contour such that the bus bars must be disposed in a non-parallel relationship. A typical illustration is the circular type of closure which is frequently found in marine or aeronautical craft. If two parallel equidistant bus bars were employed in such a unit, it would be impossible to place them in proper position to obtain the benefit of the electroconductive coating over the entire area of the closure. Consequently, in this and many other installations, non-parallel bus bars must be employed to secure full coverage of the glass base by an electroconductive film. Such panels show a serious tendency to fracture or fail in test or in use.

In accordance with this invention, it has been found that one of the causes of such failure is unequal distribution of current flow along one or both of the bus bars. This is especially true in the case of uniform resistivity bases, upon which, unequal distribution of current flow will result in unequal heating. It has been found that substantial reduction in failures may be effected by providing means between the bus bars for effectively reducing such unequal distribution.

It will be understood that when a panel is provided with non-parallel bus bars, the current flow will tend to be highest at the point or points where the bus bars are closest together and lowest at the point or points where the bus bars are farthest apart. In like manner, when one bus bar of a pair of bus bars (whether parallel or not) is longer than the other, the density of current flow and consequent heat generation tends to be highest at the ends of the shorter bus bar. A further possibility occurs in the case of a panel having the shape of a parallelogram in which the bus bars are substantially parallel and equal in length. In such a case the density of current flow and consequent heat generation tends to be highest at the terminus of the bus bar which is perpendicularly across from the opposed bus bar. Consequently, a large current may flow to a bus bar at one point or area along its length and a relatively lower current may flow to the bus bar at another point or area along its length.

According to this invention, means are provided to direct and control current flow between bus bars on an electroconductive panel such as described above, and particularly means are provided whereby to reduce the magnitude of variation of current flow along one or both of the bus bars.

Such a result may be effected by advantageous placement of electroconductive aids or electroconductive areas in the electroconductive transparent film and intermediate the marginal edge bus bars. At sections where the distance between opposite points on the bus bars is greatest the length of the path of the current passing through the electroconductive film is longest. The length of this path may in effect be reduced by placing these electroconductive aids or electroconductive areas intermediate the bus bars in these sections. Such electroconductive aids, or areas, which may be opaque or translucent, should have electroconductivity substantially above that of the transparent film and should be in electrical contact therewith. They may consist of metal or a ceramic metal composition and may have the same or different composition and conductivity as the bus bars; also, they can be applied in the same manner as the bus bars. However, this may be unnecessary since they may simply comprise localized areas of transparent film which are appreciably higher as to surface electroconductivity, usually having a surface electroconductivity several times, preferably 2 to 5 times, that of the film. For example, these aids or areas simply may be thicker spots in the film, the increased thickness providing higher electroconductivity. The density of such areas will determine the current distribution of the current flow through the conductive film.

The current passes through these areas of increased electroconductivity much more readily than it does through the less conductive electroconductive film. By reason of this arrangement the effective length of the path can be reduced in areas where the current crosses the electroconductive aids or electroconductive areas, so that the power input per unit strip of film extending laterally between any pair of opposite points on the bus bars is substantially the same throughout the length of the bar.

Figure 2:
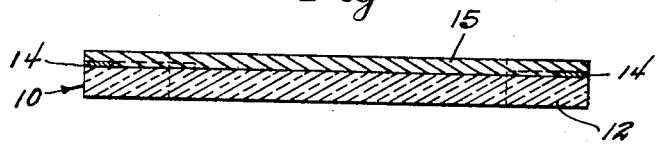
Figure 3:
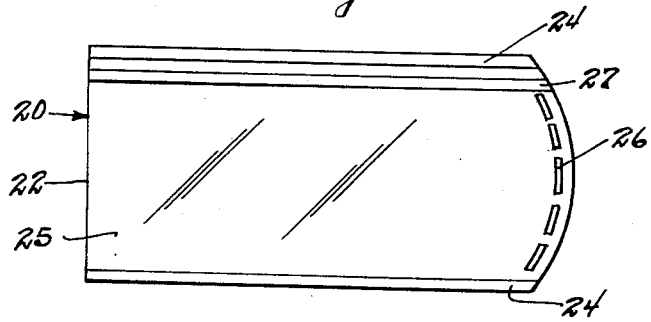
Figure 4:
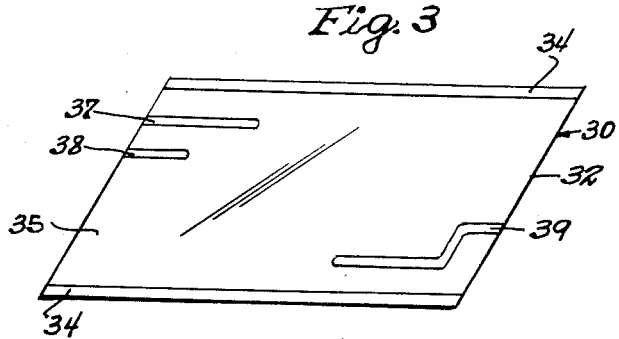

Accomplishment of the foregoing constitutes one of the principal objects of the present invention and the manner by which this and other objects of the invention are attained will be more fully understood by reference to the ensuing description taken in conjunction with the accompanying drawing in which:

Figs. 1, 3, and 4 are diagrammatic plan views of several irregularly shaped glass panels which are suitable as windshields in automobiles, locomotives or other vehicles and which illustrate various embodiments of the present invention, and Fig. 2 is a diagrammatic sectional view of Fig. 1 taken along line II—II.

In the drawing, Figs. 1 and 2 diagrammatically illustrate two embodiments of the invention. The heating panel 10 comprises an irregularly shaped glass sheet 12 having bus bars or conductive marginal edge strips 14 of an electroconductive metal such as gold, silver, copper, etc. along opposed edges and close to the edges (preferably within 0.5 inch of the edge or on the edge) of the sheet. These bus bars are disposed along the longest pair of opposite sides of the panel whereby the distance between the bus bars is held to a minimum. The bus bars 14 may be connected to opposite poles of a source of potential (not shown).

The panel 10 is provided with an electroconductive transparent film 15 such as may be produced by spraying or otherwise applying a tin compound or similar compound on the heated panel as previously described. The resistance of such film per unit square (surface film resistance) normally is substantially constant. That is, while there may be some variation in the thickness and conductivity of these films, the variation is random and generally speaking (neglecting small areas) unless special precautions are taken the average surface resistance (in ohms per unit square) of areas of the film between one pair of opposed sections will not materially differ (rarely more than plus or minus 50 percent from the average for the entire film) from that between another pair of opposed bus bar sections.

When the circuit is closed, electric current passes through the electroconductive transparent film 15 and heat is generated by virtue of the resistance of the film. As stated above, the current passes more readily through the electroconductive coating where the distance between the bus bars is shortest. Thus there results an excess of heat at this area and a deficiency of heat at points intermediate the bus bars where they are farthest apart. In Fig. 1 such an area of excessive heating would exist between the right hand termini of the bus bars 14, since the current path would be the shortest in this area. However, in accordance with this invention, if the resistance between the bus bars at other areas on the panel is made substantially equal to that of the film at the right hand side of the panel, then the current would no longer tend to concentrate in the path between the right hand termini of the bus bars, but would flow substantially evenly between the bus bars at all points throughout their length.

This has been accomplished in the panel 10 in Fig. 1 by placing electroconductive aids or areas 17 of higher conductivity than the film intermediate the left hand termini of the bus bars. The electroconductive aids 17 have a lower resistance than the electroconductive film 15, thus the resistance between the main bus bars 14 is decreased. By proper arrangement of electroconductive aids, the film resistance between the bus bars may be controlled so that it is substantially the same throughout the entire length of the bus bars. The electroconductive aids 17 may be of the same composition as the bus bars 14 or of a different electroconductive composition.

As shown in Fig. 1, these electroconductive aids are in the form of elongated unconnected strips extending substantially perpendicular to the bus bars preferably intermediate the bus bars in areas where the bus bars are farther apart than other areas. Some of these strips are in direct physical and electrical connection with the bus bars themselves. The strips may be from one-quarter of an inch to an inch or more in length and from one-sixteenth to one-quarter inch or more in width. Of course, other sizes and shapes may be resorted to in achieving particular results, for example squares or small circular dots may be employed in lieu of the strips as shown. The number of strips employed will depend upon the current distribution desired and even a single strip in contact with the bus bars or separated therefrom may be sufficient. Another embodiment is shown in Fig. 1 which comprises forming the right hand portion 18 of the lower bus bar 14 of a material, preferably another metal, of higher resistance than the left hand portion of the lower bus bar. This will reduce the current flow between the right hand termini of the bus bars, which would ordinarily attract the most current because the distance between the bus bars is shortest between these termini.

Referring to Fig. 3, another irregularly shaped panel is shown illustrating several additional embodiments similar to that shown in Fig. 1. The panel 20 in Fig. 3 comprises a glass base 22 having bus bars or conductive edge strips 24 of a ceramic gold, silver, copper, or other electroconductive metal composition along opposite edges. The panel 20 is provided with an electroconductive transparent film 25 in the manner previously described in conjunction with Fig. 1. In this panel the longest current path is between the right hand termini of the bus bars around the bulge in area C. The current does not tend to flow through this area in the bulge adjacent the right hand edge of the panel because this represents a longer path for it to follow between the bus bars. Consequently, this section will be cooler than the rest of the panel.

On the panel 20 is shown a further type of electroconductive area 26 which may be utilized to decrease the resistance in section C and cause more current to flow through such section thereby heating it. Electroconductive strips 26 extending in an arcuate pattern from one bus bar to another substantially parallel to the right hand edge of the base 22 present a further embodiment for providing current flow and heat generation to the section C of the panel 20. These electroconductive strips 26 are isolated from and not connected with the bus bars 24, but are connected electrically therewith by means of the electroconductive film 25.

An electroconductive aid 29 in the form of a narrow elongated strip of electroconductive metal spaced from and running completely across the panel parallel to the top bus bar is employed to distribute current evenly to the top bus bar thereby preventing the formation of an excessively heated area in the film adjacent the right hand terminus of the top bus bar.

Further examples of electroconductive aids or areas are shown in Fig. 4. The panel 30 comprises a glass base 32 in the shape of a parallelogram having bus bars or conductive edge strips 34 and provided with an electroconductive transparent film 35. There is a tendency for the sections of the base and film adjacent the obtuse angles of the panel to heat up more than the rest of the panel thus causing failures at the termini of the bus bars in these sections. By means of electroconductive aids 37, 38 and 39 in the form of narrow elongated strips extending from the edge of the base forming the obtuse angle partially across the base substantially parallel to the nearest bus bar, the current entering these sections of higher conductivity is distributed throughout the length of the aids and dispersed evenly therefrom, thereby preventing any localized concentration current at the above designated termini of the bus bars 34. Such aids are usually in the form of narrow elongated strips extending laterally across the base and they may or may not be parallel to the main bus bars and may or may not be in the form of a straight line. It will be noted that electroconductive aid 38 is shorter than electroconductive aid 37 and is disposed between it and the bottom bus bar. This auxiliary conductive aid prevents excessive concentration of current flow at the end of electroconductive aid 37. Any desired number of such spaced aids may be dispersed along the edge of the conductive panel to compensate for the spacing of the opposed ends of the bus bars. Moreover, as shown by electroconductive aid 39, the electroconductive aids may be curved in any convenient pattern to achieve the current distribution sought.

In the various embodiments described above, it will be understood that substantially any desired distribution of current flow through the transparent electroconductive film may be obtained by controlling the shape of the current path or the overall resistance of the film paths between the bus bars. In general, the electroconductive aids or areas of higher electroconductivity are disposed so as to equalize flow of current over the panel to achieve reasonably uniform heating. However, exactly equal current flow is not necessary to achieve essentially uniform heating since some variation is permissible, the usual object being to obtain a panel in which the temperature established during current flow within any area having a width equal to 10 percent of the length of a bus bar is within 50° F. of the temperature established in another area of the panel.

The invention is particularly applicable to use in connection with transparent tin oxide films. However, the invention is also applicable in connection with other transparent electroconductive films, particularly metal oxide films. Thus the films herein contemplated may comprise cadmium oxide, zinv oxide, indium oxide, titanium oxide, thallium oxide, etc. which may be prepared using the bromide, chloride or acetate of the corresponding metal. Transparent metal films normally have poor light transmission but are suitable where this property is not seriously objectionable.

Where viewing closures for vehicles are to be provided, the base for the film normally is ordinary window or soda lime glass. Other refractory materials including borosilicate glass, china, mica, phosphate glass, silicon carbide, tungsten carbide, porcelain, stone or other refractory composition which melts at temperatures above 1150 to 1350° F. may be provided with electroconductive coatings in the same manner.

Although the present invention has been described with reference to the specific details of certain embodiments, thereof, it is not intended that such details shall be regarded as limitations upon the scope of the inven- This application is a continuation-in-part of my application filed March 22, 1949, Serial No. 82,728, now Patent No. 2,557,983, for Electroconductive Articles.

I claim:

1. An article of manufacture which comprises a refractory base having thereon a pair of laterally spaced electroconductive bus bars, a transparent electroconductive film upon the base in electrical contact with the bus bars, and electroconductive areas of higher electroconductivity than the film spaced intermediate the laterally spaced bus bars and in electrical contact with the electroconductive film.

2. An article of manufacture which comprises a refractory base having thereon a pair of laterally spaced non-parallel electroconductive bus bars, a transparent electroconductive film upon the base in electrical contact with said bus bars, and electroconductive areas of higher conductivity than the film spaced intermediate the laterally spaced bus bars.

3. An article according to claim 2 wherein the electroconductive areas have at least twice the electroconductivity of the film.

4. An article according to claim 2 wherein the areas of higher electroconductivity are composed of electroconductive metal.

5. The article according to claim 2 wherein the electroconductive areas are composed of electroconductive ceramic metal.

6. The article according to claim 2 wherein the transparent electroconductive film contains tin oxide.

7. The article according to claim 2 wherein the electroconductive areas are located intermediate opposed portions of the bus bars which are farther apart than other opposed portions of the bus bars.

8. An article of manufacture which comprises a refractory base having thereon a pair of laterally spaced electroconductive bus bars disposed in a non-parallel manner, a transparent electroconductive film upon the base, which film is less electroconductive than the bus bars and in electrical contact therewith and narrow elongated strips extending substantially perpendicularly from the bus bars intermediate the bus bars in areas where the bus bars are farther apart than other areas, said strips being of higher electroconductivity than the film.

9. An article of manufacture which comprises a refractory base having thereon a pair of laterally spaced electroconductive bus bars, a transparent electroconductive film upon the base, which film is less conductive than the bus bars and in electrical contact therewith, and a narrow elongated strip spaced from the bus bars and extending across a portion of the base substantially parallel to the nearest bus bar, said strip being of higher electroconductivity than the film.

10. An article of manufacture which comprises a refractory base having thereon a pair of laterally spaced electroconductive bus bars, a transparent electroconductive film upon the base in electrical contact with said bus bars, and a narrow elongated electroconductive metal strip spaced intermediate the laterally spaced bus bars and in electrical contact with the film.

11. An article of manufacture which comprises a refractory base having thereon a pair of laterally spaced non-parallel electroconductive bus bars, a transparent electroconductive film upon the base in electrical contact with said bus bars, and a narrow elongated electroconductive metal strip spaced intermediate the laterally spaced bus bars and in electrical contact with the film.

12. An article of manufacture which comprises a refractory base having thereon a pair of laterally spaced electroconductive bus bars, a transparent electroconductive film upon the base in electrical contact with said bus bars, and a narrow elongated electroconductive ceramic metal strip spaced intermediate the laterally spaced bus bars and in electrical contact with the film.

13. An article of manufacture which comprises a refractory base having thereon a pair of laterally spaced electroconductive bus bars, a transparent electroconductive film upon the base, which film is less conductive than the bus bars and in electrical contact therewith, and a narrow elongated electroconductive metal strip spaced from the bus bars and extending across a portion of the base substantially parallel to the nearer bus bar, said strip being in electrical contact with the film.

References Cited in the file of this patent

UNITED STATES PATENTS

| | | |
|---|---|---|
| 2,005,922 | Stoekle | June 25, 1935 |
| 2,021,661 | Kisfaludy | Nov. 19, 1935 |
| 2,134,870 | Fruth | Nov. 1, 1938 |
| 2,557,983 | Linder | June 26, 1951 |
| 2,569,773 | Orr | Oct. 2, 1951 |